United States Patent [19]

Davis et al.

[11] Patent Number: 5,709,350
[45] Date of Patent: Jan. 20, 1998

[54] DEVICE FOR TRANSFERRING FISHING LINE

[76] Inventors: Joseph Louis Davis, 1708 S. 5th Pl., Broken Arrow, Okla. 74012; Harold A. Demarest, 4715 W. 88th St., Tulsa, Okla. 74132

[21] Appl. No.: 601,096

[22] Filed: Feb. 14, 1996

[51] Int. Cl.[6] .................... B65H 75/30; B65H 54/02
[52] U.S. Cl. .................... 242/390.8; 242/397.3; 242/422.3; 242/396; 242/902; 242/599.2; 242/598.3; 242/596.4
[58] Field of Search ................ 242/390.8, 390.9, 242/397.3, 422.3, 396, 902, 599.2, 298.3, 598.4, 596.4, 599.3, 599.4, 47

[56] References Cited

U.S. PATENT DOCUMENTS

| | | | |
|---|---|---|---|
| 1,967,676 | 7/1934 | Marchev | 242/599.3 |
| 1,981,133 | 11/1934 | Waters | 242/422.3 |
| 2,055,039 | 9/1936 | Meisel | 242/599.2 |
| 2,177,489 | 10/1939 | Jamieson | 242/422.3 |
| 2,443,763 | 6/1948 | Dahlgren et al. | 242/596.4 |
| 2,859,656 | 11/1958 | Lemieux | 242/596.4 |
| 2,903,196 | 9/1959 | Fowler | 242/599.4 |
| 3,026,059 | 3/1962 | Dennler | 242/902 |
| 3,301,499 | 1/1967 | Ewing | 242/599.2 |
| 3,421,710 | 1/1969 | Mier | 242/422.3 |
| 3,498,553 | 3/1970 | Lee | |
| 3,647,155 | 3/1972 | Jorgenson | |
| 3,704,840 | 12/1972 | Haddock | |
| 4,007,886 | 2/1977 | Kaminstein | |
| 4,284,995 | 8/1981 | Gordon | 242/599.2 |
| 4,310,126 | 1/1982 | Norleen | 242/47 |
| 4,588,139 | 5/1986 | Lines | |
| 4,795,107 | 1/1989 | Williams | |
| 4,897,512 | 1/1990 | Johnston | 242/397.3 |

*Primary Examiner*—John M. Jillions
*Attorney, Agent, or Firm*—Scott R. Zingerman; Frank J. Catalano

[57] ABSTRACT

A rotatable shaft supports supply spools having new fishing line thereon and a take-up spool for receiving worn-out line. An electric motor is provided to rotate the shaft in a take-off direction. The motor by being energized applies tension to line as it is taken from a supply spool to a fishing reel on a fishing rod. Ballast resistors in the power line leading to the motor act as an overload current absorber.

19 Claims, 8 Drawing Sheets

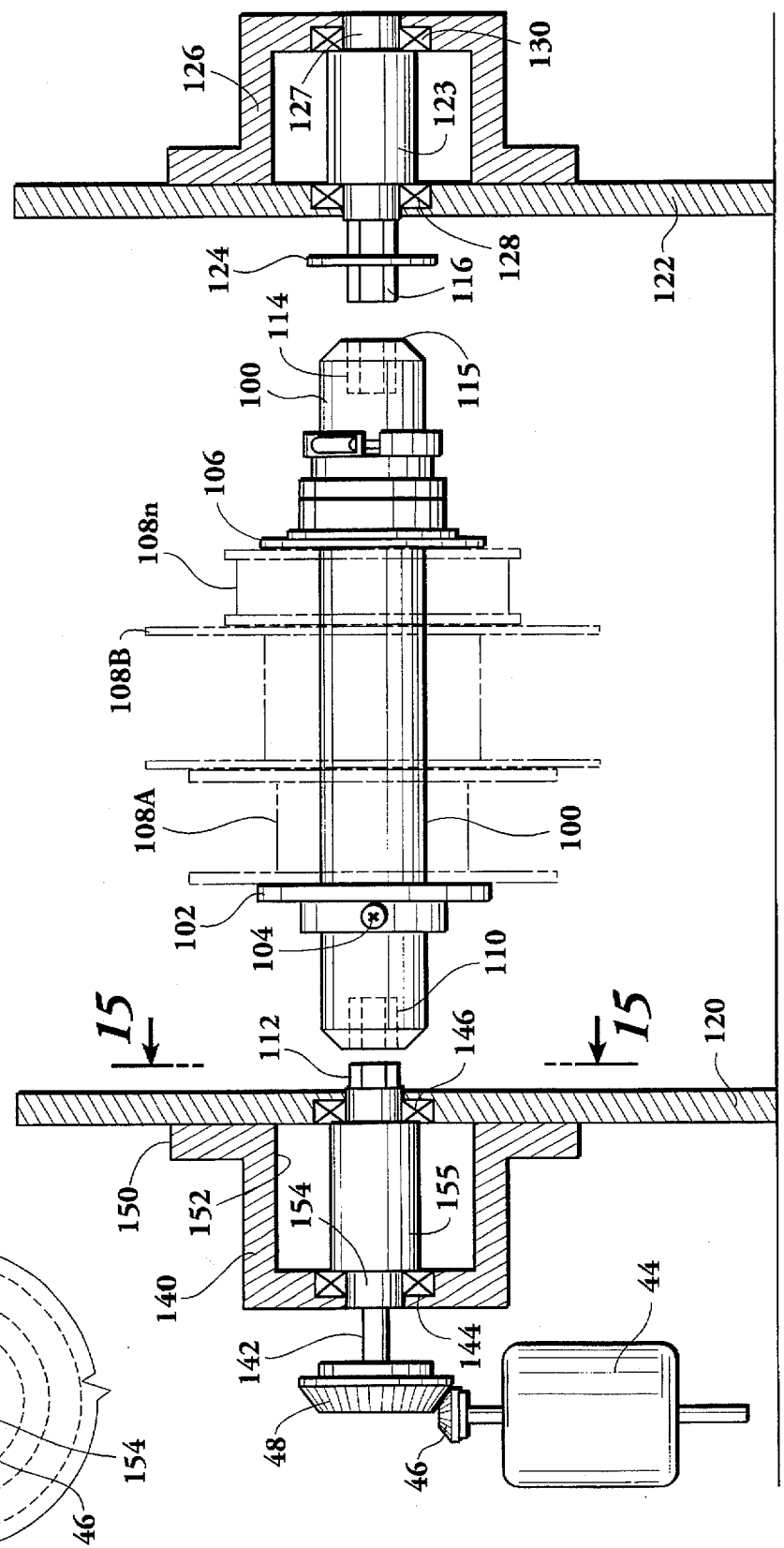
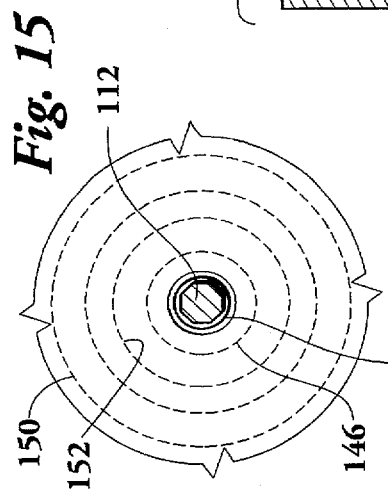
Fig. 8
Fig. 15

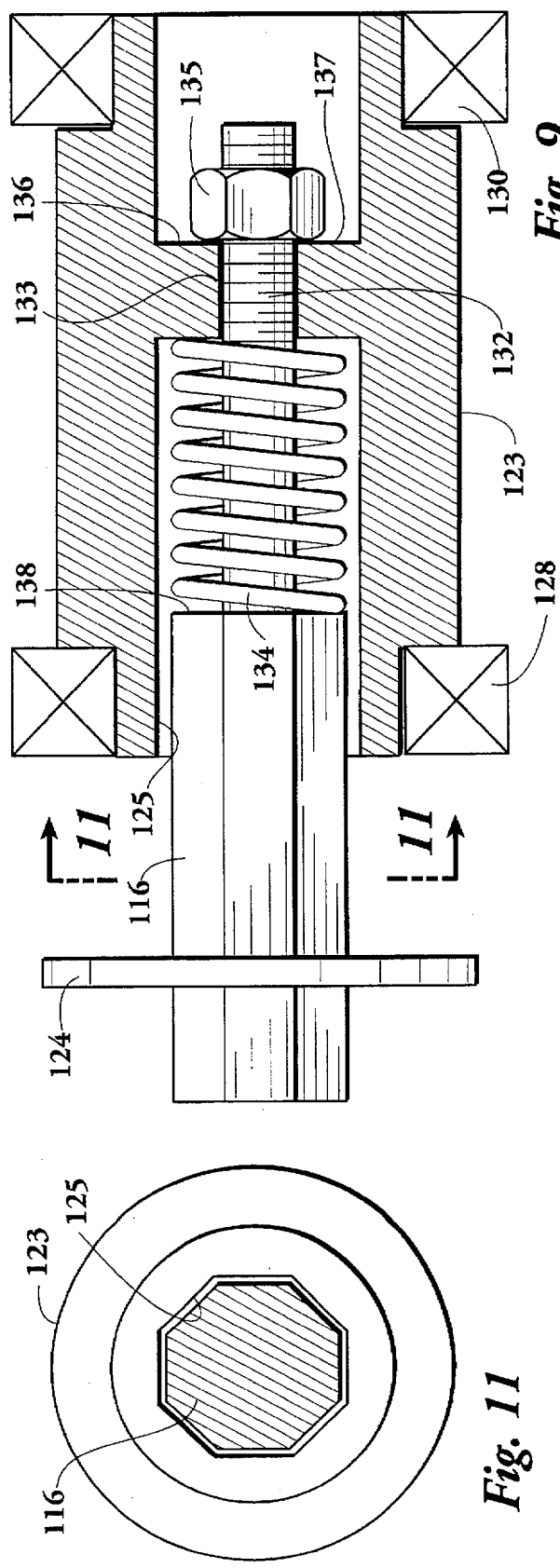
Fig. 9
Fig. 11
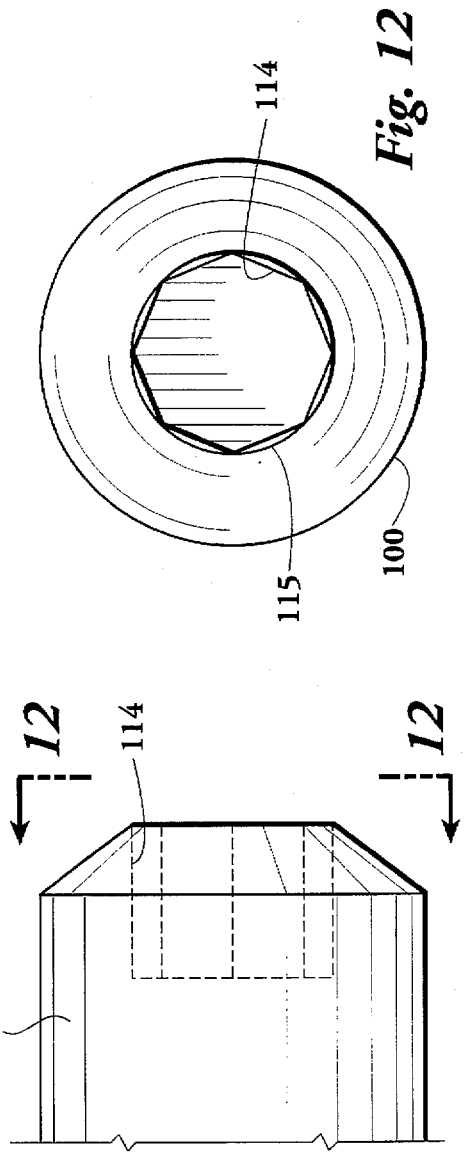
Fig. 12
Fig. 10

DEVICE FOR TRANSFERRING FISHING LINE

BACKGROUND OF THE INVENTION

The present invention relates to an apparatus for transferring fishing line from a supply spool to a fishing reel spool and spent line from such reel to a spent line spool.

Fishing is a very popular sport in this country. Most fishermen own a fishing reel upon which is wound a fishing line. This fishing line may take on various colors, weights, and material. After extended use, the fishing line usually becomes worn or frayed and must be replaced. Sometimes it is desired to replace the line on the fishing reel with a different type line to meet the particular needs of the fisherman. The spent line should be disposed of in an environmentally safe manner. Fishermen normally like to dispose of the spent fishing line in an acceptable manner and not just toss it away into the water where they are fishing or into some other part of the environment.

There is a need for an efficient and portable device for transferring fishing line from a supply spool to a fishing reel spool and spent line from such reel to a spent line spool. That is what this invention accomplishes.

SUMMARY OF THE INVENTION

This device is used basically for two main functions. A first function is for removing old line from reels and storing it on a take-up spool. A second function is to dispense new fishing line from a line supply spool onto a fishing reel. The device includes a U-shaped frame which has two spaced apart upright members supported from a base. A rotatable shaft is rotatably and releasably supported between these two upright members. One end of the shaft is driven by a motor, preferably an electric one. The shaft or rod is of a length to hold a selected number of spools having different or selected type of fishing line, such as weight, color, etc., plus a waste line take-up spool.

There is a control panel for controlling the electric motor. There are essentially two modes of operation. One mode may be called the "RESPOOL" Mode which is used for providing line from a spool on a shaft to the fishing reel. The other mode is the "TAKEUP" or "STRIP" Mode for stripping line from a fishing reel. When in the STRIP Mode, one has a takeup spool on the shaft which is used to store the used line taken from the fishing reel.

When one wishes to add new line to a fishing reel, one selects the spool having the desired line thereon. The fishing reel will normally be empty or free of any fishing line thereon, as will be seen, which may be conveniently done using the device of this invention. The end of the line from the supply spool is then tied or otherwise secured to the fishing reel. The control circuit is then selected to be in the fishing reel "RESPOOL"mode. On actuating, the electric motor applies torque in a "take-up" rotational direction for adding line to the spool which is opposite the "take-off" direction for removing line from the supply spool. In the RESPOOL Mode, the operator turns the fishing reel in the direction to remove line from the line supply spool on the shaft and to wind it onto the fishing reel. As the operator turns the reel handle, tension is maintained on the line between the new line supply spool and the fishing reel by the motor trying to turn in the take-up direction which is opposite the unwound rotation which is the rotation applied by turning the fishing feel. This tension prevents entanglement of the line as it is wound onto the fishing reel. The tension is controlled through a circuit such as a potentiometer with variable electric potential so that adjustment can be made to cause the torque from the motor to increase or decrease. Special electric control means are provided so that no damage caused by current overload will occur to electric motor or electronic circuit system. When the desired amount of line has been released on the reel, one stops turning the fishing reel and the motor is stopped. The fishing line is cut, and a holddown sticker is placed on the free end of the new line supply spool.

We will now discuss the TAKEUP Mode. It is frequently desired or necessary to remove old line from a fishing reel. The free end of the line from the fishing reel is tied to the takeup spool on the shaft. There is preferably a motorized line guide supported on the base in front of the takeup spool on which the used line is to be wound. The TAKEUP mode of the circuit is selected. The spool release trigger on the fishing reel is pressed. The motor is started and rotates until all of the old line has been removed from the fishing reel. During operation, the old line will feed off of the fishing reel through the motorized line guide which will lay the line down evenly across the takeup or waste spool. When the takeup spool is filled, the waste line thereof can be disposed of in an environmentally acceptable manner.

In another and preferred embodiment, the rotatable shaft supporting the various spools is composed of a first abbreviated shaft driven by the motor and extending through a first upright member. A second abbreviated shaft is rotatably supported by the other upright member and has spring biased movement perpendicular to said second upright member. A spool support cylinder is removably insertable between the two abbreviated shafts. Each abbreviated shaft has an extension with non-circular cross-section which extends into like configured holes in each end of said cylinder. The support cylinder is thus rotatable by rotation of said first abbreviated shaft and can be removed by pushing this second abbreviated member out of the hole in the second end of the cylinder.

It is thus seen as one object of this invention to provide a device for use in placing new line from a supply spool to a fishing reel without entanglement of the line.

It is still another object of this invention to provide a device in which the spent line can be unwound from a fishing reel and placed upon a takeup or waste line spool, These and other objects of the invention may be better understood from the description that follows in conjunction with the drawings, in which:

BRIEF DESCRIPTION OF THE DRAWINGS

FIG. 8 illustrates another embodiment of the invention in which the spool support shaft has a removable spool support cylinder and two abbreviated shaft end sections for supporting waste and new line spools.

FIG. 9 illustrates, partly in section, means for releasably supporting one end of one abbreviated shaft section of FIG. 8.

FIG. 10 illustrates a modification of the end of the cylindrical portion of the support shaft for receiving the abbreviated shaft shown in FIG. 9.

FIG. 11 is a view taken along the line 11—11 of FIG. 9.

FIG. 12 is a view taken along the line 12—12 of FIG. 10.

FIG. 15 is a view taken along the line 15—15 of FIG. 8.

DETAILED DESCRIPTION OF THE EMBODIMENTS OF THE INVENTION

Figure 1:
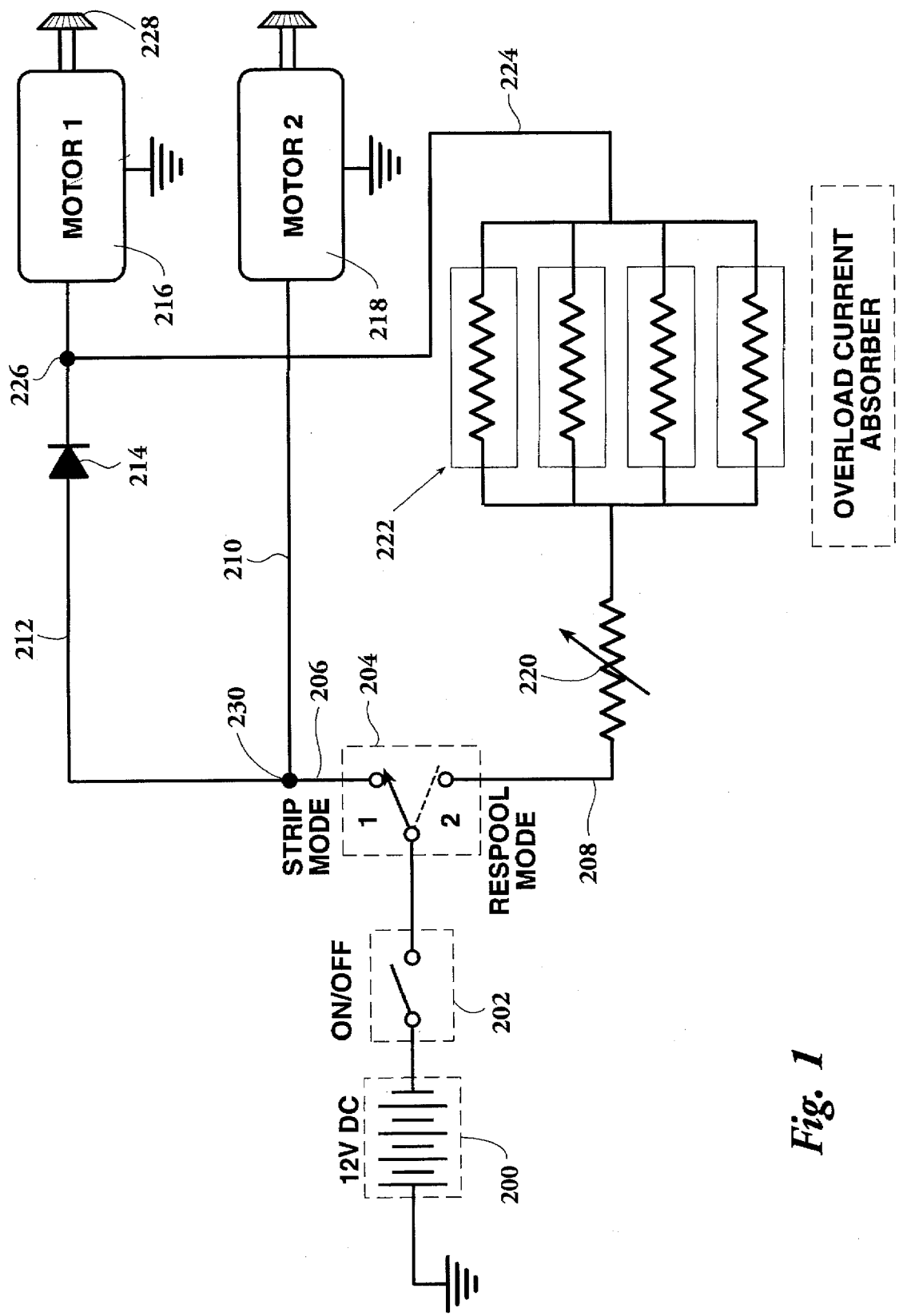
FIG. 1 is a conceptual electrical circuit diagram showing the STRIP Mode and the RESPOOL Mode.

Attention is first directed to FIG. 1 which shows the basic overall concept of our invention. Shown thereon is a power source 200 which preferably is a 12-volt DC power source which is connected to master switch 202 having an "On" position and "Off" position. The master switch 202 is shown connected to the input toggle switch 204 which has a Position 1 and Position 2. When in Position 1, it is connected to place the apparatus in the "STRIP" Mode. When toggle switch 204 is in the Number 2 position, it is in the RESPOOL Mode. The STRIP Mode is the Mode in which the apparatus is in when it is desired to remove spent or worn line from a fishing reel. The RESPOOL Mode is the position in which the apparatus will be placed when it is desired to add new fishing line to a reel from a supply spool.

The Number 1 position of toggle switch 204 (the STRIP Mode) is connected to an electrical conduit or line 206 which connects to junction 230 which provides for an output electrical line 210 connected to a motorized line guide 218. The other portion of the Y circuit from junction 230 is electrical conduit 212 which connects through junction 226 to electrical motor 216 which is the rewind motor. Also in line 212 is a diode 214 which permits electrical current to flow through line 212 only in the direction from junction 230 to junction 226 and motor 216. Motor 216 has an output power gear 228 which is used to turn a shaft upon which the waste spool and the supply line spool are mounted as will be fully discussed in relation to the rest of the drawings, especially FIGS. 1, 2, 3, and 8.

When it is desired to strip or remove worn line or to change line by removing a line from the fishing reel, the line is attached to a waste line spool driven by motor 216. Then the power is supplied through toggle switch 204 to motors 216 and 218. The motor rotates the supply take-up or waste spool while at the same time the motorized guideline 218 drags the line along the spool to make smooth winding upon the take-up spool. If desired, a hand-held switch 52 (see FIG. 2) can be put into line segment 206 for remote operation. If the remote operation is used in operation of the motors, the master switch 202 is turned to the "On" position, and the toggle switch is in the 1 position for "strip". However, until the hand-held switch is activated, the motors 1 and 2 receive no power. By activating the hand-held switch, the two motors are activated as described above.

When it is desired to operate the system in the RESPOOL Mode, toggle switch 204 is placed in the No. 2 position which connects power to the electric conduit 208 which is connected to potentiometer 220. Potentiometer 220 is used to control the voltage and current to motor 216. The output of potentiometer 220 is connected to a device 222 for absorbing overload current. As indicated, a suitable heat absorption means is a plurality of ballast resistors such as Radio Shack® Power Resistors Cat. No. 271-133. Other overload flow compensators can be other power absorption means such as a pulse width modulator or a transistor control modulator. These overload current compensators, i.e. ballast resistors, pulse width modulator, and transistor control power modulators are well known to those skilled in the art.

In the RESPOOL Mode when master power switch 202 is in the "On" position and toggle switch 204 is in the No. 2 position, current flow is through the potentiometer 220, overload power compensator 222, and line 224 to motor 216 to cause it to drive gear 228. It will be noted that diode 214 in line 212 prevents current from flowing through conduits 212 and 210 back to motor 218. When in this RESPOOL Mode, motor 218 is inoperative. In the RESPOOL Mode when one wishes to add new line to a fishing reel, the line from such supply spool is secured to the fishing reel. The supply spool is on the shaft driven by motor 216 whose rotation will take-up or add line to the spool. The power is turned "On" and the motor 216 begins to rotate in its normal direction for adding line to the spool. The fishing reel when it is turned to remove line from the supply spool tends to force the motor 216 to turn in a reverse direction from which it normally turns. This is necessary to keep tension on the line being placed on the fishing reel to be evenly spaced on the fishing reel and will not become tangled, etc. By forcing the motor 216 to go in its reverse direction, considerable power overload can be generated and must be compensated for. That is what overload current flow compensator 222 does. This absorbs the overflow current and thus prevents motor 216 from overheating and "burning" out. When the fishing reel has been wound to obtain the desired amount of fishing line thereon, the power is turned off; the fishing line is cut from the supply spool and then can be used to connect to the fishing hook or whatever.

Figure 2:
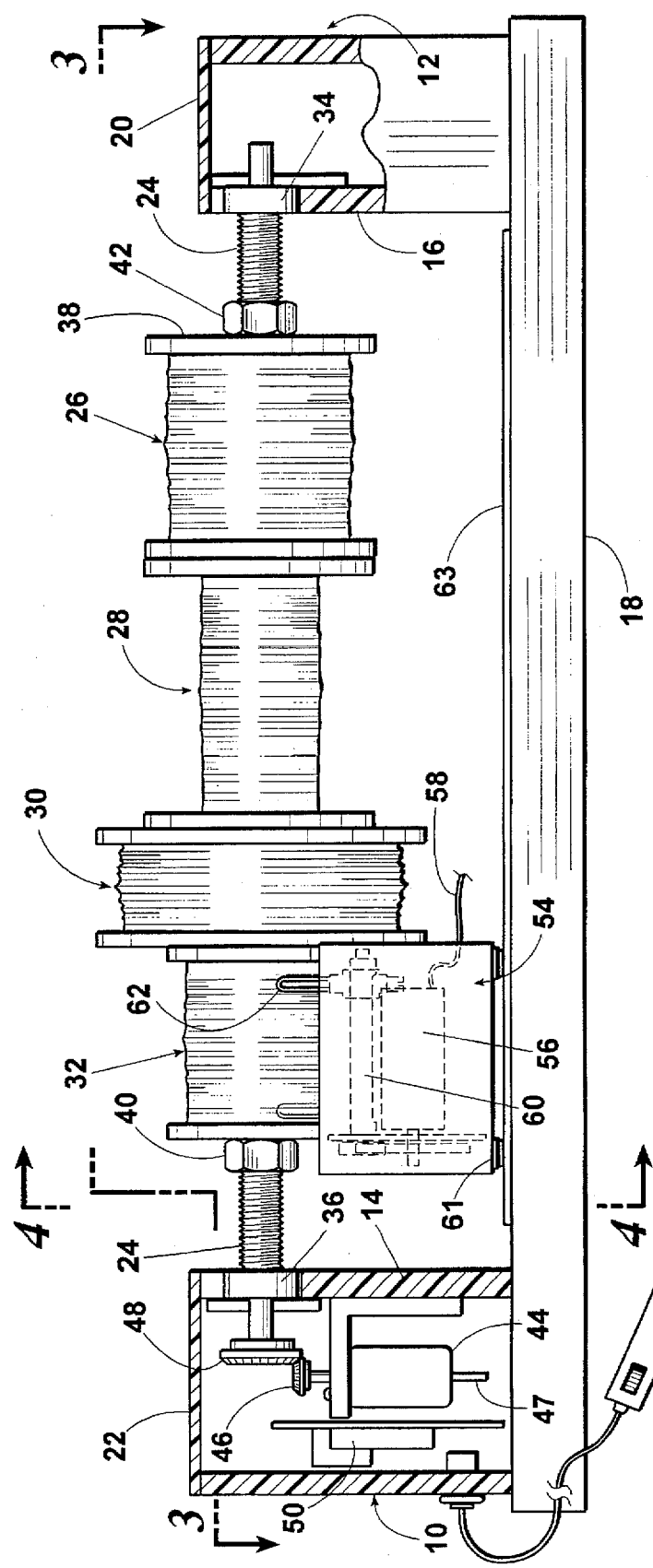
FIG. 2 is a side view partly in section showing one embodiment of the invention for adding or removing line from a fishing reel.

Attention is next directed to FIG. 2 which shows partly in section a side view of the device of this invention with takeup spool and new line supply spool mounted on a shaft. Shown thereon is a U frame having a base 18 and a first upright compartment or support 10 on one end thereof, and a second upright compartment or support 12 on the other end. Compartment 10 is provided with an inner upright shaft bearing support wall or member 14. The other end of the shaft is supported by bearing support wall or member 16 which is a part of the upright compartment 12. Shaft 24 is supported by bearing 34 from bearing support wall 16 and by support shaft bearing 36 from bearing support wall 14.

Mounted upon shaft 24 are new line supply spools 26, 28, and 30 and takeup or waste line spool 32. These may all be conventional spools having a central core and end members or plates 38. A spool locking nut 40 is provided on one threaded end portion of shaft 24, and a second spool locking nut 42 is provided on the threaded portion at the other end of the shaft. After the spools have been placed on the shaft, the nuts 40 and 42 are screwed onto the shaft 24 and tightened until they form a compressed unit of the spools. Thus in this condition the spools will rotate with the rotation of shaft 24. The shaft support bearing 34 is positioned about one end of shaft 24 in a bearing receiving notch in bearing support wall 16, and the second similar bearing 36 is positioned on the other end of shaft 24 and positioned in a bearing receiving notch in bearing support wall 14. Compartment 10 has a top 22, and compartment 12 has a top 20. These tops can be hinged or screwed or otherwise removably attached thereto. Compartment 12 can be used to store wrenches, scissors, or what else a fisherman may desire.

Power control is in compartment 10 which includes an electric motor 44 which is typically a 2 to 18 volt DC motor with power supply conduit 47. The shaft of motor 44 is provided with a bevel gear 46 which mates with bevel gear 48 which is attached to the shaft 24. Thus rotation of motor 44 causes rotation of shaft 24 through gears 46 and 48. Electronics control panel 50 is provided for motor 44. A remote control switch 52 is provided. As will be seen, it is useful in stripping or removing used or worn-out line from a fishing reel.

A motorized line guide 54 is supported from plate 63 on base 18. Plate 63 should be metal and have an iron component so that the motorized line guide 54 having magnetic feet 61 will allow the guide to be held in any selected position when the motorized line guide is placed thereon. The motorized line guide 54 has a motor 56 with a power supply line 58 and a worm gear 60. A moving hairpin loop 62 is provided and moves along the worm gear 60 as it is rotated by motor 56. The spent line or worn-out line from the fishing reel is threaded through the loop 62 and is secured to the pickup spool 32. Then as the spool 32 is rotated, the worn-out line will be deposited neatly and orderly on the spool 32.

Figure 3:
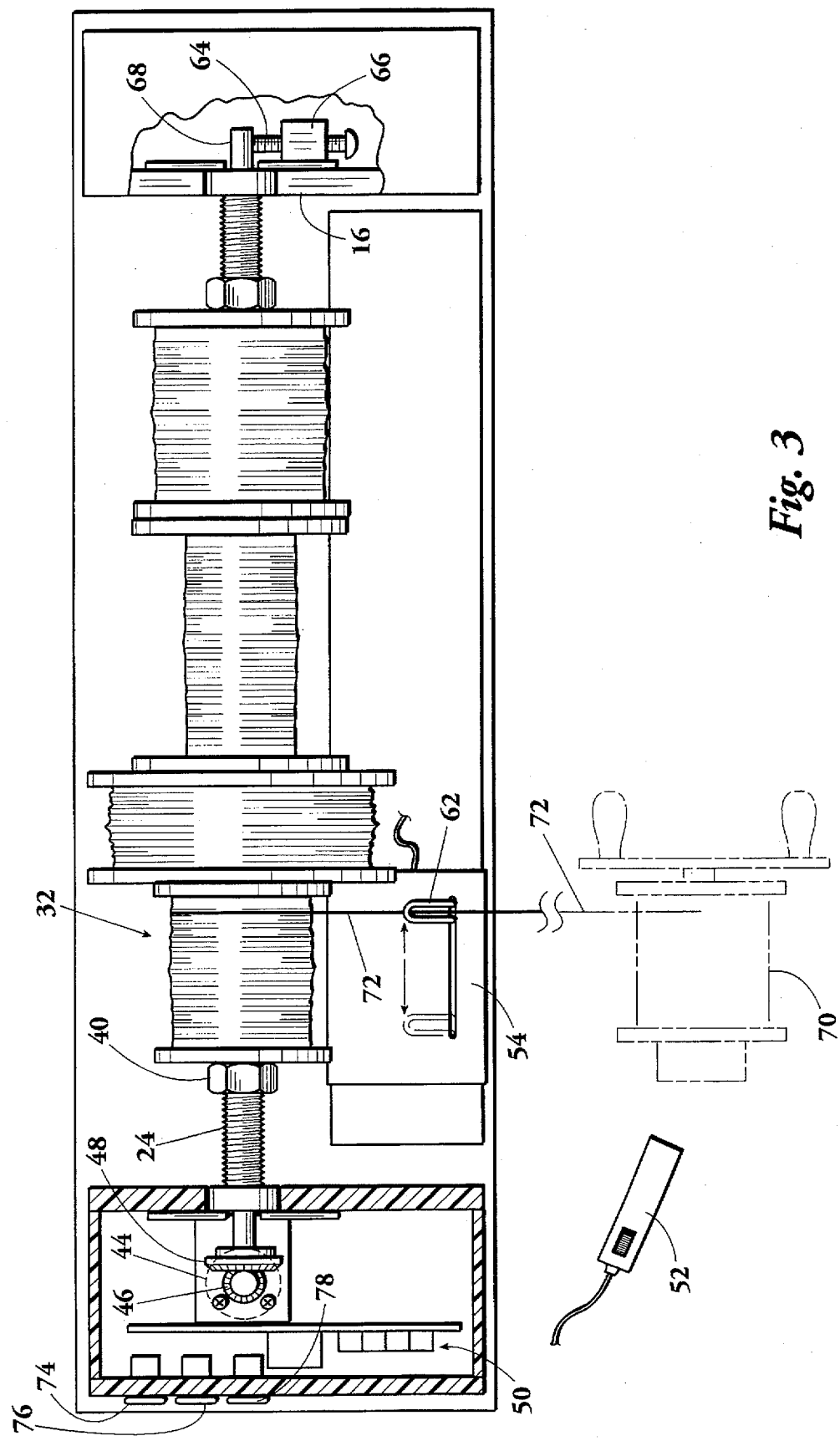
FIG. 3 is a view taken along the line 3—3 of FIG. 2.

Attention is now especially directed to FIG. 3 which is a view taken along the line 3—3 of FIG. 2. Sometimes when placing the spools on the shaft, the shaft will rotate slightly and will not stay in a steady position because the bearings 34 and 36 will remove most of the friction that might prevent rotation. If unenergized, motor 44 would cause little resistance. Thus, it is preferred to have a system for stabilizing the position of the shaft 24 when in its non-operating position as shown in FIG. 3. This is conveniently accomplished by providing a screw 64 through threaded housing 66 supported from support wall 16. The screw 64 is made of suitable plastic material. The screw 64 is tightened against the end portion 68 of shaft 24 to supply sufficient friction to prevent rotation of shaft 68 when it is not driven by the motor. The friction is sufficiently small so as to permit the drive motor 44 to easily overcome it when energized.

Also shown in FIG. 3 is reel 70, shown in phantom, having a spent line or waste line 72 thereon which extends through loop 62 to waste or disposal spool 32. Also shown on FIG. 3 are electronic panel 50, supply power socket 74, plug in 76 for remote stop and start of motor for stripping or removing spent line from a reel, and a plug 78 into which a line can be inserted for providing power such as 12 volt DC thereto.

Figure 4:
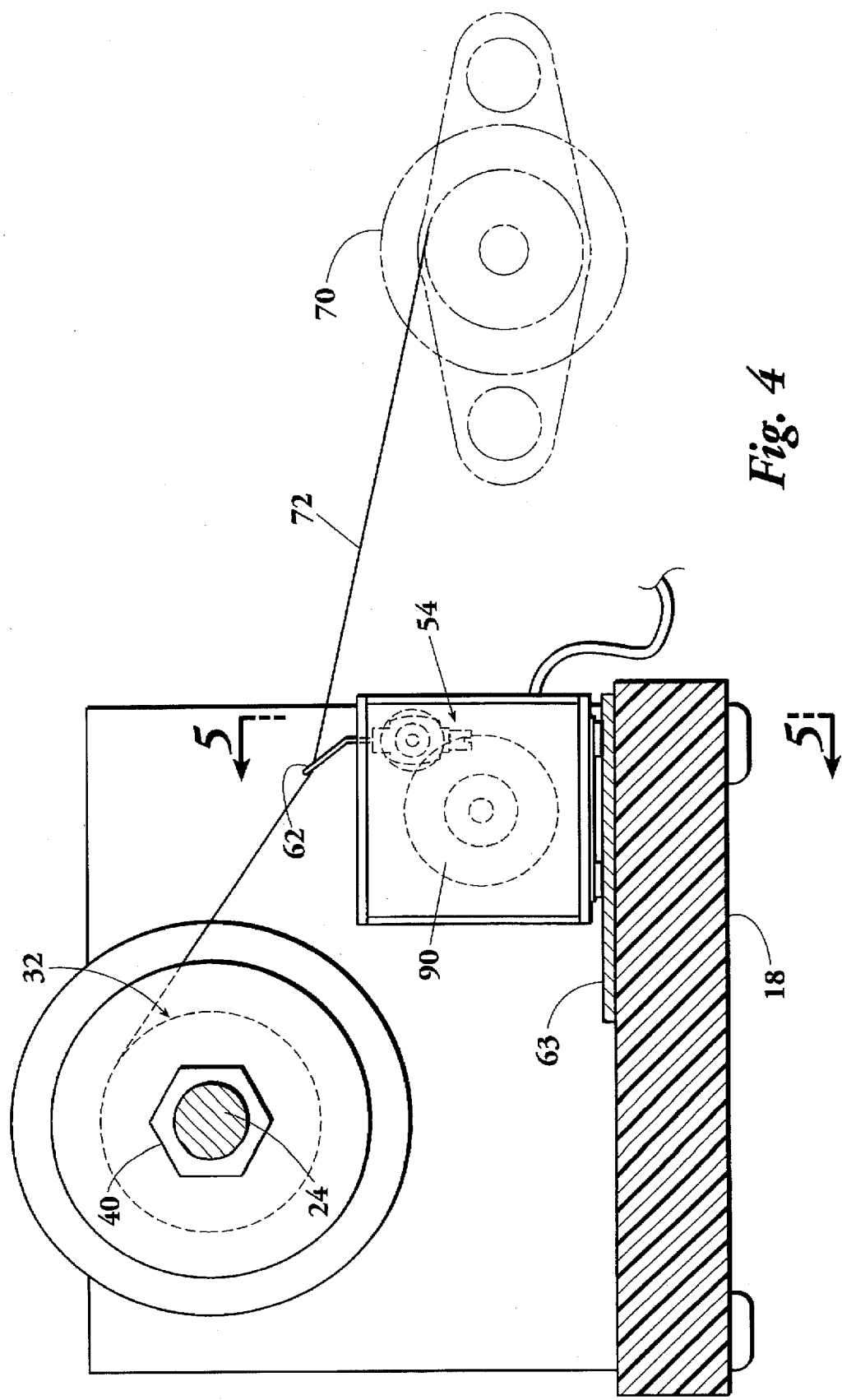
FIG. 4 is a detail along the line 4—4 of FIG. 2.

FIG. 4 is a view taken along the line 4—4 of FIG. 2 and shows the worn-out spent line 72 being removed from reel 70 and through loop 62 to be wound on spent spool 32.

Figure 5:
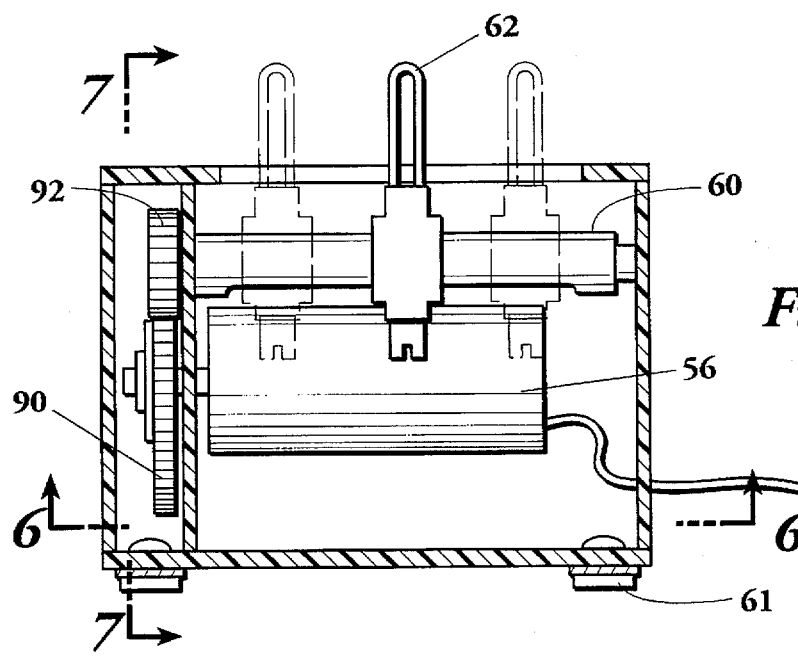
FIG. 5 is a view taken along the line 5—5 of FIG. 4.

FIG. 5 is a view taken along the line 5—5 of FIG. 4 and shows eyelet 62 in the center position with the phantom position on either side thereof to indicate the movement as the worm gear 60 is rotated.

Figure 6:
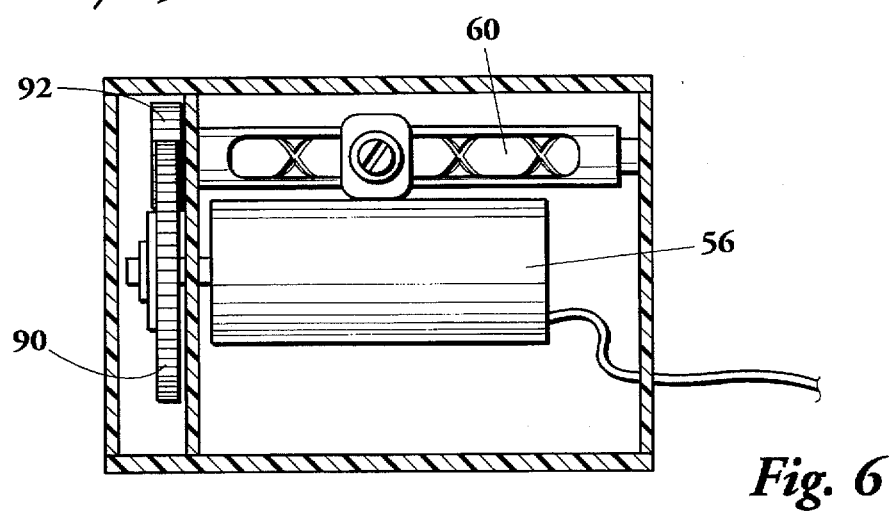
FIG. 6 is a view taken along the line 6—6 of FIG. 5.
Figure 7:
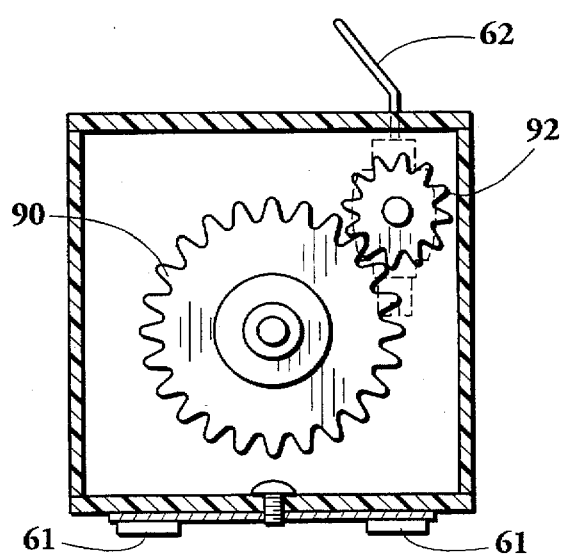
FIG. 7 is a view taken along the line 7—7 of FIG. 6.

FIG. 6 is a view taken along the line 6—6 of FIG. 5. FIG. 7 is a view taken along the line 7—7 of FIG. 5. These figures clearly show motor gear 90 which is meshed with drive worm tooth gear 92 which in turn rotates worm gear 60.

Another embodiment, and the preferred one, of this invention will now be discussed in conjunction with FIGS. 8–15. This embodiment is similar in overall concept to the embodiment shown in FIG. 2. However, the support shaft which supports the spools is different. The support shaft includes a center spool support shaft which is removable in a different manner. Attention is first directed to FIG. 8 which shows a spool support cylinder 100 supporting spools 108A, 108B, and 108n shown in phantom and removably supported between upright support frames 120 and 122 which serves similar function of upright members 14 and 16 of FIG. 2. This FIG. 8 is shown in partially exploded view. Octagonal abbreviated shaft 112 is driven by motor 44 through gears 46 and 48. Abbreviated shaft section 112 is supported by bearings 144 and 146 supported by housings 140 and frame 120. Shaft 112 removably fits into octagonal hole 110 of spool support 100. Octagonal abbreviated shaft 116 fits into octagonal hole 114 in the other end of support cylinder 100. As will be seen in operation, the shaft 112 is in hole 110 so as to impart rotation to spool support 100 and give it support, and shaft 116 is in hole 114 to give it support.

Attention is now directed to the power side of the device of FIG. 8. Shown thereon is motor 44, gears 46 and 48 (similar to that of FIG. 3) which rotates shaft 142. As shown, is an enlarged portion 154 of shaft 142 which rotates freely on bearings 144 and 146 which are recessed in housing 140 and in frame 120, respectively. Housing 140 has internal surface 152 and a shoulder member 150. An enlarged section 155 on shaft 142 serves as a spacer. Housing 140 is supported from frame 120. A spool retaining washer 102 is secured to spool support cylinder 100 by screws 104 which, when tightened, prevent movement of washer 102 with respect to the spool support cylinder 100. The other end of the support cylinder 100 includes a free floating washer 106 which when secured to the support cylinder 100 in cooperation with spool retaining washer 102 holds the spools in fixed position on the support cylinder 100. Octagonal shaft section 116 is provided with enlarged cylindrical section 127 which is supported from frame 122 and support cover 126 by bearings 128 and 130, respectively. Enlarged barrel-like spacer 123 is provided in housing 126. Cover 126 is supported from frame 122.

Attention is next directed to FIGS. 9 and 11 which illustrate how the octagonal shaft 116 can be pushed to the right to clear hole 114 in end 115 of shaft support cylinder 100 a sufficient distance to permit removal of cylinder 100. This includes a shaft extension 132 which extends into bore 125 of barrel 123 and through a hole 133 in shoulder 136 which is a shoulder in barrel 123. There is a shoulder 138 between octagonal shaft 116 and shaft extension 132. A spring 134 is positioned around the shaft extension 132 and extends between shoulder 138 and shoulder 136. A nut 135 is threadedly connected onto the outer end of shaft extension 132 and holds the shaft in position as spring 134 will force nut 135 against shoulder 137. Thus shaft 116 is biased toward support cylinder 100. By pushing on push washer 124 toward spring 134, the spring will be compressed, and shaft 116 will be pushed out of octagonal hole 114. The travel is sufficient so that spool support cylinder 100 can be moved to the right so that octagonal shaft 112 clears hole 110 in the other end of support cylinder 100. Then the spool support cylinder 100 can be removed.

Figure 13:
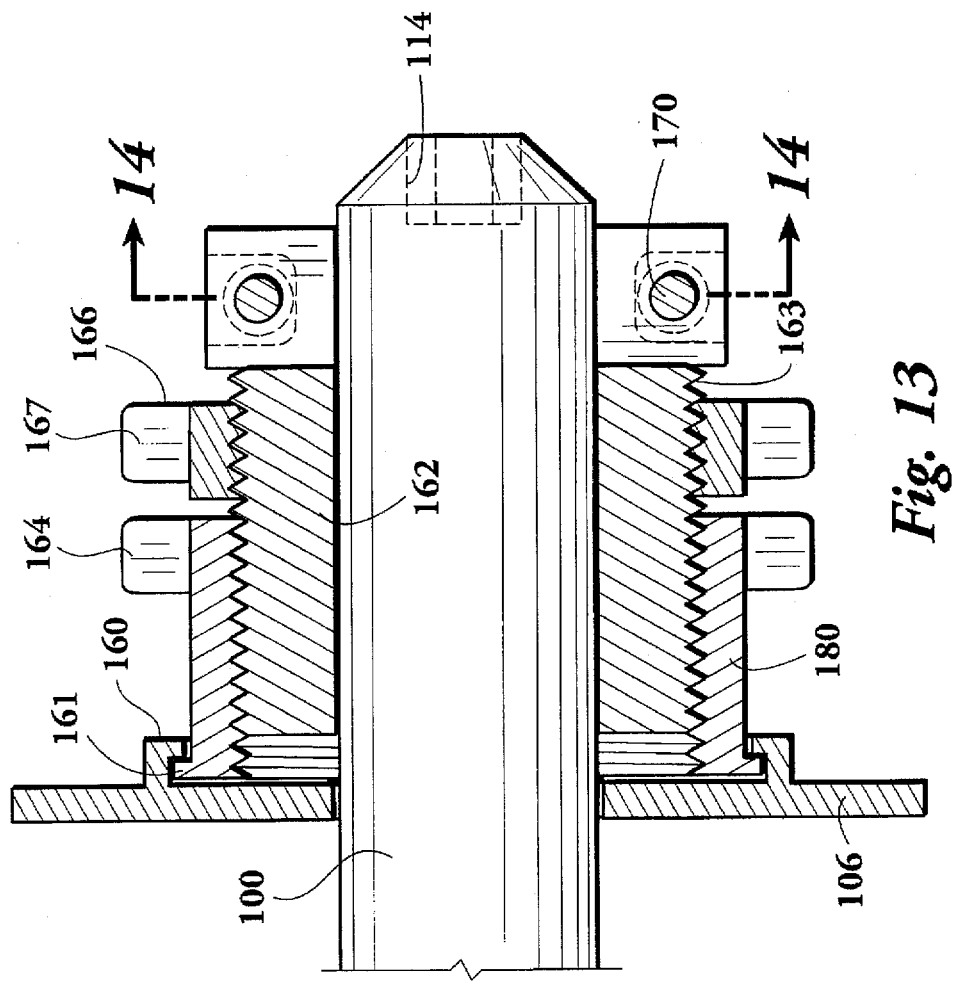
FIG. 13 is a view partly in section showing apparatus for holding in a fixed position one end of spools about and with respect to the periphery of the spool support cylinder.
Figure 14:
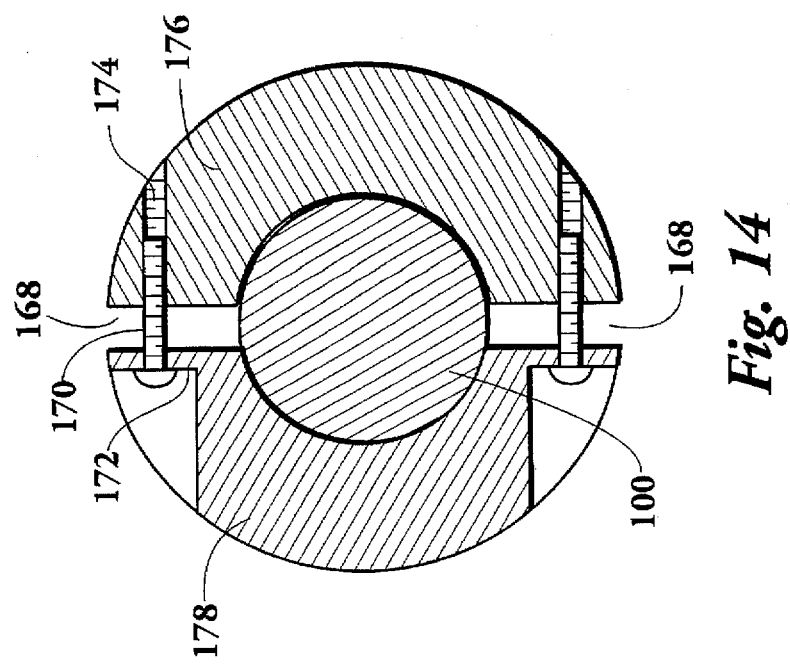
FIG. 14 is a view taken along the line 14—14 of FIG. 13.

Attention is next directed to FIGS. 13 and 14 which illustrate the means for holding free floating washer 106 snugly against the spools which are supported between washer 106 and spool retaining washer 102. This includes a removable inner barrel 162 which slides over cylinder 100 and is threaded on the outer periphery. The end of barrel 162 toward the frame 122 is split as shown in FIG. 14 to have a slit 168 which extends preferably to near the threaded portion 163 of inner barrel 162. An outer barrel 180 has internal threads which mate with the external threads of inner barrel 162.

We shall now discuss means for holding the inner barrel 162 in the selected position. As shown in FIG. 14, this includes slit 168 between split segments 176 and 178. Screw 170 extends through a hole in portion 172 and extends into a threaded hole 174 of the other slit side 176. By tightening the screws 170, the split halves 176 and 178 will engage spool support cylinder 100 with sufficient force as to prevent longitudinal and rotational movement with respect to cylinder 100. In order to get additional axial force against the free floating washer 106 after spools are added on cylinder 100, outer barrel 180 will be rotated by pushing on lug 164 until the desired snugness is obtained between the free floating washer 106 and the spools. It is to be noted that the outer barrel 180 is held with respect to the free floating washer 106 by a snap-on pressure lock plate 160 which cooperates with lug 161 of the outer barrel 180. When the desired snugness is obtained, jam nut 166 is rotated by applying pressure on lug 167 until it "locks" with lug 164 of the outer barrel 180.

In operation, after the desired number of spools have been placed on spool support cylinder 100 and moved against the spool retaining washer 102, outer barrel 180 is connected or snapped to free floating washer 106 and screwed partly onto inner barrel 162 to form a unit which fits over support cylinder 100 and slid to the position where free floating washer 106 contacts the end of fishing line spool 108n. Outer barrel 180 has enough longitudinal movement by screwing to hold the free floating washer 106 snugly against the spool 108n. Screws 170 are tightened to hold inner barrel 162 in a fixed position with respect to support cylinder 100. Outer barrel 180 is then rotated to force washer 106 into compression contact with the end plate of spool 108n. The cylinder 100 may now be placed into position to engage abbreviated shafts 112 and 114. In such process, shaft 116, will be shoved to compress spring 134, cylinder 100 inserted to receive shaft 112; and upon release of force on 116 to receive shaft 116 in the hole on the other end. Removal of cylinder 100 is accomplished by a reverse operation.

While the invention has been described with a certain degree of particularity, it is manifest that many changes may be made in the details of construction without departing from the spirit and scope of this disclosure. It is understood that the invention is not limited to the embodiment set forth herein for purposes of exemplification, but is to be limited only by the scope of the attached claim or claims, including the full range of equivalency to which each element thereof is entitled.

What is claimed is:

1. A device for paying out and taking in fishing line to and from a fishing reel spool which comprises;

a base;

two spaced apart upright support members supported from said base;

a spool support rod between said two spaced apart upright support members;

a supply spool mounted on said spool support rod in a manner to be rotated therewith;

a takeup spool mounted on said spool support rod in a manner to be rotated therewith;

said rod rotatable in a spool takeup direction or spool discharge rotational direction;

an electric motor for driving said rod in a spool take-up rotational direction;

means to apply drag resistance through said motor to said rod while said rod is rotating in a spool discharge direction.

2. A device as defined in claim 1 including a worm line guide supported from said base adjacent said takeup spool.

3. A device as defined in claim 1 in which the means to apply drag resistance includes a power line between a power source and said motor and including a potentiometer and ballast resistors.

4. A device as defined in claim 1 including a power supply line between a power source and said motor in which there is a pulse width modulator in said supply line.

5. A device as defined in claim 1 including a power supply line between a power source and said motor in which there is an analog transistor control circuit in said supply line.

6. A device as defined in claim 3 including a direct line, a two-way switch in which one way is connected to said potentiometer and a direct line to said motor is connected to the other way.

7. A device as defined in claim 4 including a two-way switch having a first and second position in which a first direct line connects said first position to said motor and a second direct line connecting said second position connects to said pulse width modulator.

8. A device as defined in claim 5 including a two-way switch having a first and second position in which a first direct line connects said first position to said motor and a second direct line connecting said second position connection to said analog transistor control circuit.

9. A device as defined in claim 1 in which said support rod includes:

a first shaft connectable at one end to be driven by said motor, said first shaft extending through said upright support member;

a second shaft supported from the other upright support member with an inner section extending through said other support member, the cross-section of said first and second shafts are non-circular;

a spool support cylinder insertable between said first shaft and said second shaft, one end having a hole for receiving the end of said first shaft extending inside said frame, and a hole in the other end of said support cylinder for receiving the inner section of said second shaft;

a spring assembly supported by said second support member biasing said second shaft toward said first support member;

and a first spool retaining washer secured to said spool support cylinder and a spaced apart free floating washer for supporting spools between;

means for holding said free floating washer in a selected position on said spool support cylinder.

10. A device as defined in claim 9 in which said means to hold includes a threaded inner barrel surrounding a portion of said support cylinder and having a split end and threaded bolt extending through said split ends for forcing the split portion of the inner barrel into firm contact with said cylindrical support member;

an outer barrel having inner threads which mesh with the outer threads of said inner barrel and a snap-on pressure plate connecting the end of said outer barrel to said free floating washer;

a jam nut surrounding and threaded to the outer threads of said inner barrel and rotatable against the outer barrel.

11. A device as defined in claim 1 including means to provide limited mechanical frictional resistance to the rotation of said support rod.

12. An electrical device useful in the process of transferring fishing line from a supply spool to fishing reel spool and spent line from such reel to a spent line takeup spool which comprises;

a spool driving motor having a normal rotation direction;

a motorized line guide;

a power source;

a master switch;

a two-way switch having a first position which when activated activates a strip mode, and a second position which when activated activates a respool mode;

a first conduit connecting the number one position on said two-way switch to a first conduit junction, a second electrical conduit connecting said first junction to said motorized line guide, a third electrical conduit connecting said first junction to said spool driving motor;

a gate in said third electrical conduit permitting flow of current only from said first junction to said motor;

respool mode circuitry includes a potentiometer, a overload power absorption unit connected to the output of said potentiometer, a fourth electrical conduit connecting the second position of said two-way switch to said potentiometer, a fifth electrical conduit connecting the output of said potentiometer to said absorption unit, and a sixth electrical conduit connecting the output of said absorption unit to said first motor.

13. A device as defined in claim 12 in which said gate is a diode.

14. A device as defined in claim 12 in which said overload power absorption device comprises ballast resistors.

15. A device as defined in claim 12 in which said overflow power absorption device is a pulse width modulator.

16. A device as defined in claim 12 in which said overload power absorption device is a transistor controlled power modulator.

17. A device for transferring fishing line from a supply spool to a fishing reel spool and spent line from such reel to a spent line spool, which comprises:

a base;

two spaced apart upright support members supported from said base;

a spool support rod between said two spaced apart upright support members;

said rod rotatable in a spool takeup direction or spool discharge rotational direction;

an electric motor for driving said rod in a spool take-up rotational direction;

means to apply drag resistance through said motor to said rod while said rod is rotating in a spool discharge direction;

said means to apply drag resistance includes a power line between the power source and said motor and including a potentiometer and ballast resistors;

a direct line, a two-way switch in which one way is connected to said potentiometer and a direct line to said motor is connected to the other way.

18. A device for transferring fishing line from a supply spool to a fishing reel spool and spent line from such reel to a spent line spool which comprises:

a base;

two spaced apart upright support members supported from said base;

a spool support rod between said two spaced apart upright support members;

said rod rotatable in a spool takeup direction or spool discharge rotational direction;

an electric motor for driving said rod in a spool takeup rotational direction;

means to apply drag resistance through said motor to said rod while said rod is rotating in a spool discharge direction;

said support rod includes:

a first shaft connectable at one end to be driven by said motor, said first shaft extending through said upright support member;

a second shaft supported from the other upright support member with an inner section extending through said other support member, the cross-section of said first and second shafts are non-circular;

a spool support cylinder insertable between said first shaft and said second shaft, one end having a hole for receiving the end of said first shaft extending inside said frame, and a hole in the other end of said support cylinder for receiving the inner section of said second shaft;

a spring assembly supported by said second support member biasing said second shaft toward said first support member;

a first spool retaining washer secured to said spool support cylinder and a spaced apart free floating washer for supporting spools between;

means for holding said free floating washer in a selected position on said spool support cylinder.

19. A device as defined in claim 18 in which said means to hold includes a threaded inner barrel surrounding a portion of said support cylinder and having a split end and threaded bolt extending through said split ends for forcing the split portion of the inner barrel into firm contact with said cylindrical support member;

an outer barrel having inner threads which mesh with the outer threads of said inner barrel and a snap-on pressure plate connecting the end of said outer barrel to said free floating washer;

a jam nut surrounding and threaded to the outer threads of said inner barrel and rotatable against the outer barrel.

* * * * *